United States Patent [19]

Frost

[11] Patent Number: 5,033,424
[45] Date of Patent: Jul. 23, 1991

[54] DUAL TRACT INDUCTION

[75] Inventor: Derek Frost, Leigh on Sea, England

[73] Assignee: Ford Motor Company, Dearborn, Mich.

[21] Appl. No.: 488,005

[22] PCT Filed: Aug. 30, 1988

[86] PCT No.: PCT/GB88/00704
§ 371 Date: May 8, 1990
§ 102(e) Date: May 8, 1990

[87] PCT Pub. No.: WO89/04918
PCT Pub. Date: Jun. 1, 1989

[30] Foreign Application Priority Data

Nov. 16, 1987 [GB] United Kingdom ................ 8726790

[51] Int. Cl.⁵ .............................................. F01L 3/00
[52] U.S. Cl. ............................ 123/188 M; 123/193 M
[58] Field of Search ............... 123/188 M, 193 M, 308

[56] References Cited

U.S. PATENT DOCUMENTS 2,669,984  2/1954  Marchal et al. ................ 123/188 M
2,804,862  9/1957  Nedwidek ...................... 123/188 M

FOREIGN PATENT DOCUMENTS 1030808  3/1953  France .

Primary Examiner—Noah P. Kamen
Attorney, Agent, or Firm—Jerome R. Drouillard; Clifford L. Sadler

[57] ABSTRACT

The invention relates to an internal combustion engine wherein two intake tracts 12, 14 balanced for equal air flow, lead to each intake valve and both tracts have outer sections which open on to the same side face of the engine, the inner sections of the tracts having axes which lie in a common plane containing the axis of the valve and the inner sections of the tracts being substantially symmetrical about the valve axis.

3 Claims, 4 Drawing Sheets

DUAL TRACT INDUCTION

BACKGROUND OF THE INVENTION

1. Field of the Invention

The present invention relates to an internal combustion engine having dual tract induction, that is to say two tracts leading to each intake valve of the engine.

2. Disclosure Information

In racing engines not intended for road vehicles, the intake ports have been inclined as near as possible to the valve axis. This makes better use of the skirt area of the valve opening and facilitates a ram effect to maximise the intake charge. However, this is not practicable in a commercial engine as the height of the engine is restricted and one is obliged to bend the intake port to permit sensible packaging. This bending distorts the flow conditions and introduces an asymmetry causing the flow to cross the valve stem which introduces turbulence and reduces the usage of the available skirt area.

GB-971,211 provides two intake tracts leading to each inlet valve from above with the aim of restoring symmetry and improving the breathing so as to improve top end performance. Other known designs (see GB-728,487) have two intake tracts, one opening on to the side of the engine in the conventional manner and the other on to the top surface of the engine. A further prior art proposal has been to provide tracts from each side of the engine leading to the same intake port.

With tracts entering the cylinder head from both sides of the engine, the performance improvement obtained was found disappointing and development was discontinued. In the case of engines with one or more tracts opening on to the top of the cylinder head, a complex design of inlet manifold is required to straddle the valve train. Furthermore, the engine needs to be fuel injected as the problems caused by the wet manifold of a carburetted engine would be difficult to overcome on account of the complex manifold design.

In further known proposals, for example GB-1,179,087, U.S. Pat. No. 4,550,699, U.S. Pat. Nos. 4,174,686 and GB-1,567,812, two inlet tracts have been used with the intention of creating swirl in the intake charge. The above patents include proposals for angling the tracts tangentially relative to the valve skirt and for introducing different amounts of air through the two tracts in order to promote swirl. The present invention, on the other hand, is not concerned with promoting swirl and on the contrary takes steps to avoid such swirl.

According to the present invention, there is provided an internal combustion engine including a cylinder head, intake poppet valves and intake tracts controlled by said valves and leading from a side face of the cylinder head to the engine cylinders, there being two tracts leading to each intake valve, characterised in that the tracts are dimensioned and shaped for substantially equal air flow under all engine operating conditions so as to supply air uniformly to the perimeter of the valve skirt without introducing swirl into the intake charge, the tracts being formed of outer sections which extend substantially parallel to the base of the head and which open separately on to the said side face of the engine and inner sections which lie in a plane containing the axis of the valve and disposed symmetrically within the latter plane about the axis of the valve, the inner sections of the tracts remaining symmetrical about the valve axis for a sufficient length to ensure that the major component of the velocity of the intake charge is directed along the valve axis.

In the prior art in which the purpose of the separate porting was to promote swirl, it was possible for the ports to open onto the side of the engine. However, it was never suggested in the prior art to employ side entry porting in arrangements where laminar air flow was to be maintained as such a port geometry appears to negate the purpose of the design, namely to maintain symmetry and equal air flow around the entire valve skirt perimeter. The present invention is predicated on the realisation that by the use of side entry, an engine with non-swirl twin porting can be packaged to fit under the bonnet of a modern motor vehicle without significantly impairing its operating performance.

Preferably, the second sections are inclined at an angle of less that 45° to the valve axis so that the major component of the velocity of the intake charge should be directed along the valve axis.

The plane containing the axes of the inner sections of the tracts should preferably extend along the engine centre line so that the tracts should be of equal length but if insufficient space is available for two port section between adjacent intake valves then it is possible for the planes of the inner tract sections to be inclined to the engine centre line.

It is also convenient that the valve axes should be inclined away from the engine centre line as this then calls for a less abrupt transition from the outer section to inner section of each tract.

The invention is concerned with an engine primarily designed for a road vehicle and differs from all prior art proposals employing dual tract induction in that the design of the intake porting is intended to take advantage not only of the top end performance but of the lean burn capability and of the improved exhaust emissions. These improvements have not previously been noted because no attempt was made to assess the performance of the prior art proposals under part load and low speed conditions as the engines were not designed for this purpose. It is believed that this is the reason why the prior art proposals have hitherto remained experimental and have never been incorporated in a commercial engine.

It has now been found, very surprisingly, that non-swirl dual tract induction can achieve significant improvements under low load and part load operation. The surprising nature of this discovery is emphasised by the fact that an engine with twin tract induction has been made to run with leaner mixtures than have previously been found possible even using four valves per cylinder.

It is generally well known that lean burn is enhanced by introducing turbulence into the charge and with this aim in mind, cylinder heads designed for lean burn have generally included means for increasing swirl and charge velocity. It is believed that a mechanism not previously appreciated is responsible for the improved lean burn capability of symmetrical twin tract porting. This mechanism involves a toroidal flow being created within the cylinder spilling over from the valve skirt. The turbulence in the toroid remains confined and better controlled and less kinetic energy is lost through friction with the cylinder walls.

An effect of the toroidal flow, which is believed to be the reason for the improved performance which has now been discovered, is that the fuel in the charge tends to be better atomised on account of the increased kinetic energy in the charge.

This explanation of the flow conditions created by symmetrical twin tract porting given above is consistent with the fact that in prior art proposals having a vertical tract and one lateral tract, better combustion occurred when fuel was injected into the vertical tract than into the lateral tract. The reason is that on account of the toroidal nature of the flow, the gases originating in one tract remain aligned with that tract and consequently the charge was stratified. Better combustion of leaner mixtures therefore occurred when a fuel concentration remained in the vicinity of the spark plug at the end of the compression stroke.

It is accordingly a preferred feature of the invention that in a fuel injected engine, fuel should be introduced into the cylinder through only one of the two tracts, namely the tract nearer the spark plug.

In the case of a carburetted engine, metering fuel in dependence upon the air flow through only one of the two intake tracts is not believed to be sufficiently accurate. However, in such an engine, the present invention, by providing access to both tracts from the same side of the engine, permits a one piece branched manifold to be employed to connect both tracts to a common carburettor. Of course, it is still possible to meter the fuel to only one tract by using a carburettor and in this case the port design of the engine also simplifies the manifold configuration. For example, one set of tracts may be supplied with air only through a first manifold and the other set of tracts may be supplied with a fuel/air mixture via a second manifold leading to a carburettor, the two manifolds having ganged throttles.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 6:
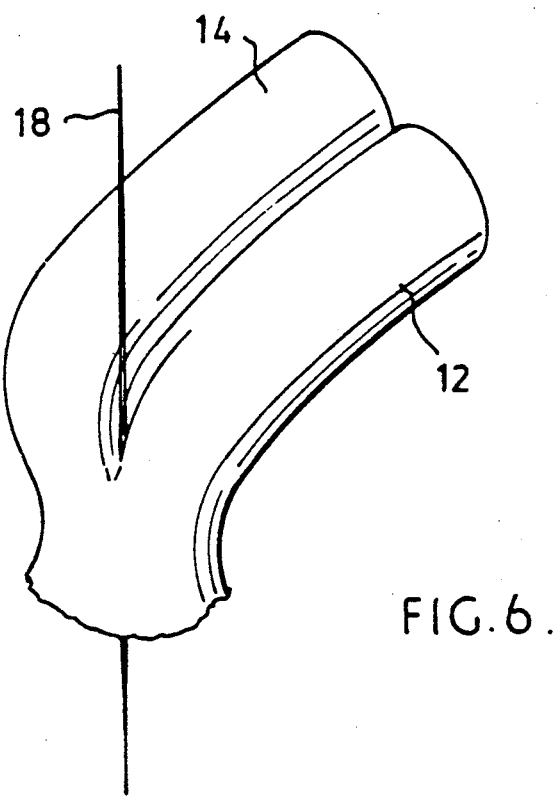
FIG. 6 shows a perspective view of the shape of the intake tracts.

FIG. 6 shows the shape of the port geometry for each intake valve of an engine. In an engine, the ports are of course hollow passages and FIG. 6 may be considered as a cast of the ports.

Each port comprises two separate tracts 12 and 14 leading to the valve skirt area of the intake valve. At their inner sections, the two tracts merge and form one passage surrounding the valve skirt and coaxial with the valve stem, the latter being represented schematically in FIG. 6 by the line 18. Air thus enters the combustion chamber along a passage coaxial with the valve.

At their outer sections, the tracts 12 and 14 are separate and open onto the same side of the engine. The transition from the outer sections to the inner sections is not abrupt to provide for a smooth flow of the induction air around the two bends. If the intake valves are inclined outwards from the engine centre line, then the angle between the inner and outer sections of the tracts is reduced, making for improved flow conditions along the tracts.

The symmetry of the port geometry ensures that equal air quantities are take in through the two tracts and the air distribution around the valve skirt is uniform. This mode of flow is believed to promote the formation of toroidal vortices and increase the lean burn capability of the engine. As the air spills over the edge of the valve it curls under the valve head face and sets up rings of turbulence which break away from the valve and move like smoke rings into the combustion chamber.

FIGS. 1 to 5 show more detailed views of an engine constructed with intake ports as schematically shown in FIG. 6.

Figure 1:
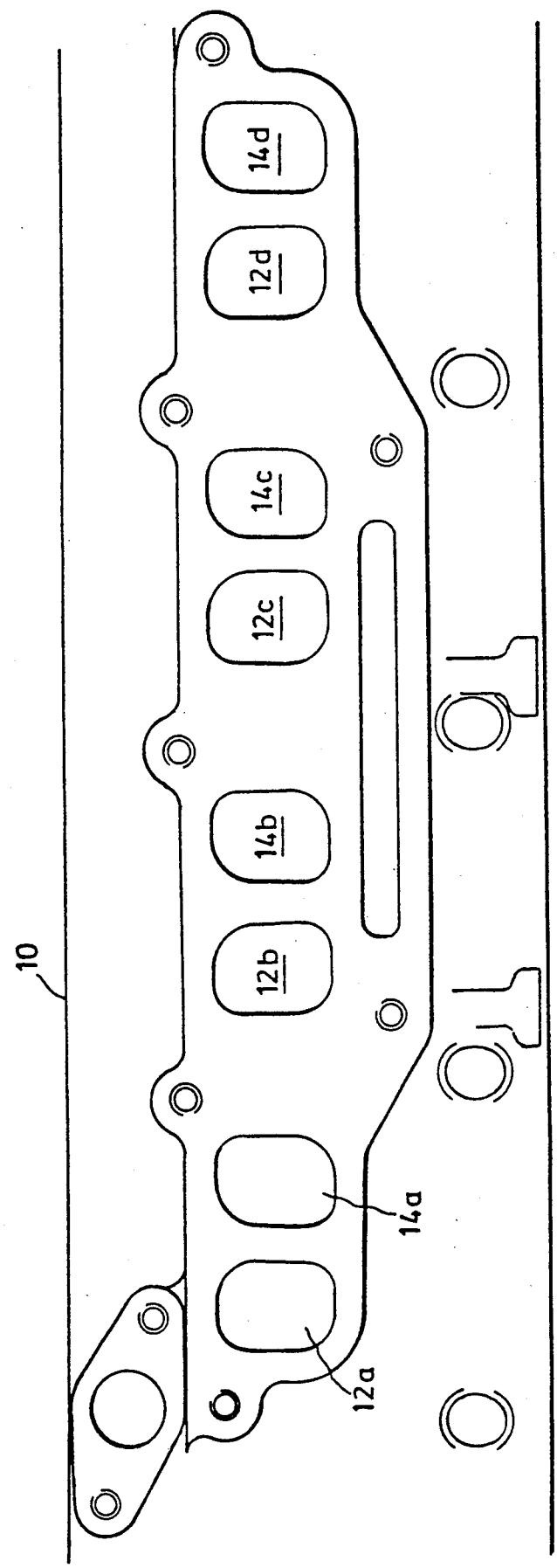
FIG. 1 is a side view of a cylinder head.

FIG. 1 shows a side view of a cylinder head 10 from the side onto which the inlet manifold is fitted. The cylinder head is for a four cylinder engine and has two inlet tracts 12a, 14a to 12d, 14d leading to each intake valve. The tracts 12, 14 converge onto the intake valve from opposite sides to provide symmetrical air flow. The various sections shown in the drawings are to illustrate the shape of the inlet tracts in detail.

Figure 4:
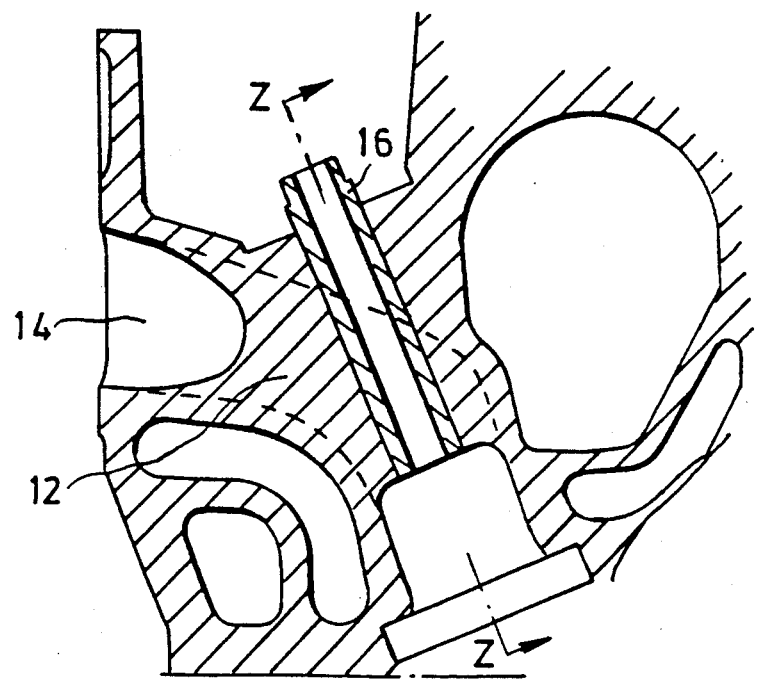
FIG. 4 is a section along the line Y—Y in FIG. 2.
Figure 5:
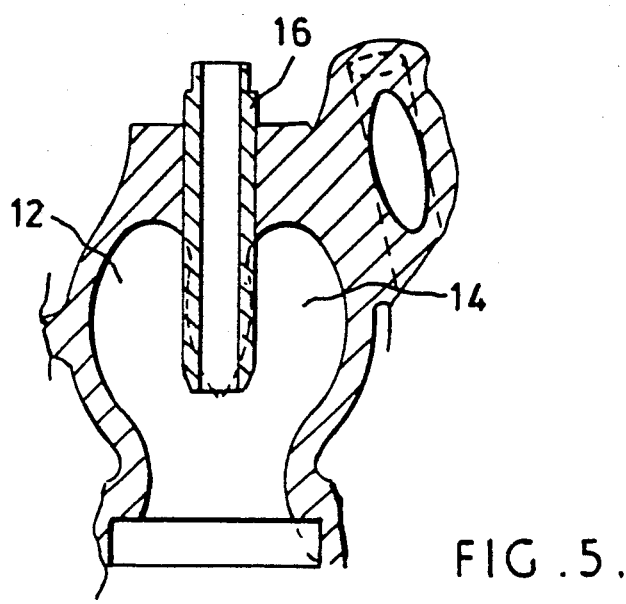
FIG. 5 is a section along the line Z—Z in FIG. 4.

The inner sections of tracts 12, 14 are best shown in the sections of FIG. 4 and 5. As viewed in FIG. 4, the axis of the valve guide 16 and axes of the individual tracts are all in the same plane, namely the section plane of FIG. 5 which is represented by the line Z—Z.

In the section of FIG. 5, it can be seen that the intake tracts are symmetrical about the the axis of the valve guide. The inner sections extend at a small angle to the valve axis, substantially less than 45° in the illustrated embodiment, so that the major component of the air velocity is parallel to the valve axis resulting in an efficient blending of the two flows.

Figure 2:
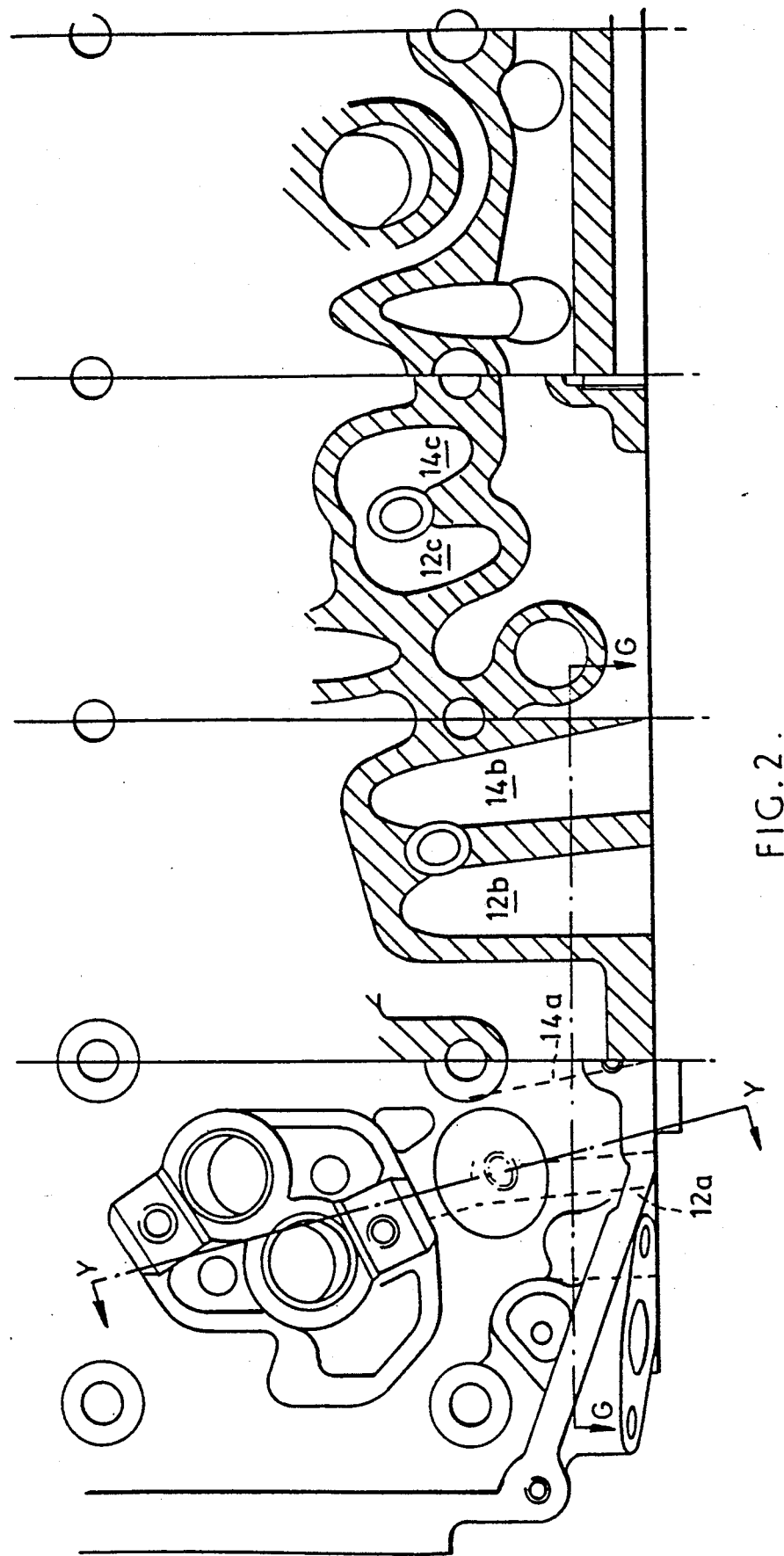
FIG. 2 is a view along a stepped section line in FIG. 1.

The different sections of FIG. 2 show the shape of the intake ports at different heights above the valve seat. The view on the left is a true plan view and the tracts 12a and 14a cannot be seen and are shown in dotted lines. The next section to the right passes through the entire outer sections of the tracts 12b and 14b and the passages leading from the inlet manifold to the opposite sides of the valve are clearly shown.

It will be noted that in the case of the embodiment illustrated, the outer section of the tract 14b is slightly longer than the outer section of the tract 12b. The reason for this is that the valve axis does not in this case lie in a transverse plane but is inclined at a compound angle to the engine axis. The plane containing the axis of the valve is therefore also slightly canted as can be seen from the angle of the section line Y-Y in FIG. 2 which passes through the valve axis. This slight asymmetry, caused by the adoption of an existing valve train, does not present serious cause for concern and can be compensated by the shape of the intake manifold. The important dimension is the total length of the intake tracts, rather than the length of any one section and the lengths can be balanced if the lengths of the branches of the inlet manifold leading to the tracts 12 are slightly longer than the lengths leading to the tracts 14.

Figure 3:
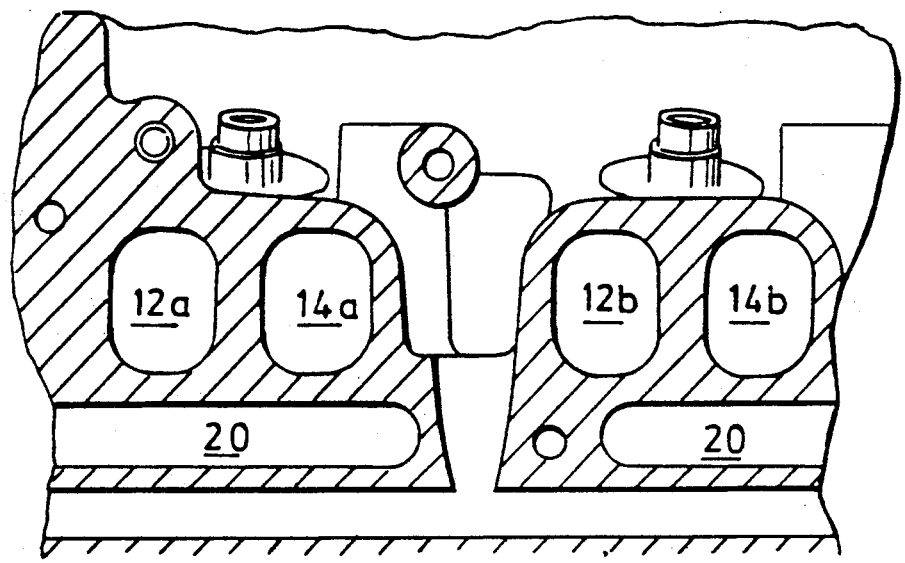
FIG. 3 is a section along the line G—G in FIG. 2.

The section of FIG. 3 shows the generally rectangular shape of the individual tracts 12 and 14 but this is not essential. The shape is chosen to optimise the through flow cross section within the constraint placed by the spacing of the cylinders and the need to package the other essential engine components.

Beneath the tracts 12 and 14 in FIG. 3, there are shown cooling passages 20 of the water jacket for cooling the intake air. FIG. 1 also shows passages for water cooling of the intake manifold.

In designing air intake ports, three different approaches have previously been adopted and each has its own strengths. The cross section may, according to these three approaches, converge gradually, remain constant or diverge gradually. It is believed that any one of these three approaches may be adopted in the port design in the present invention, but the relative merits of these approaches at different valve openings have yet to be assessed It is believed to be important that the port should be designed such that at a given valve height, the continuity of the intake manifold convergence or divergence is maintained up to the discharge area into the combustion chamber.

It will further be noted that the port illustrated in FIG. 6 includes a venturi throttle adjacent the valve seat. The shape of this portion of the port is known to be of importance to the engine performance and in designing an engine, the shape of this portion and the shape of the valve head should be carefully selected to maximise air flow at the optimum valve opening. If necessary, the valve head should be formed on the port side to conform to the required port area and shape and hollowed out on the chamber side to achieve the required shape without increasing the mass of the valve.

The fuelling of the engine may be either by carburettor or by an injection system. In the latter case, the injectors are preferably situated on whichever of the tracts is nearer the spark plug. It is feasible, to use a carburettor to fuel only one set of tracts but this is not preferred as metering errors may occur, especially during idle conditions.

I claim:

1. An internal combustion engine having a centerline parallel to the crankshaft of said engine, wherein two intake tracts, balanced for equal air flow, lead to each intake valve, with each such valve having an axis, and both tracts having outer sections which open on to the same side face of the engine, the inner sections of the tracts having axes which lie in a common plane containing the axis of the valve and the inner sections of the tracts being substantially symmetrical about the valve axis.

2. An engine as claimed in claim 1, wherein the plane containing the axes of the inner sections of the tracts (12,14) extends parallel to the engine centre line so that the tracts should be of equal length.

3. An engine as claimed in claim 1 wherein the valve axes are inclined away form the engine centre line.

* * * * *